US012585748B2

(12) United States Patent
    Manimaran

(10) Patent No.:     US 12,585,748 B2
(45) Date of Patent:        Mar. 24, 2026

(54) RECONFIGURABLE BRAILLE BOARD-BASED AUTHENTICATION SYSTEM AND METHOD THEREFOR

(71) Applicant: Visa International Service Association, San Francisco, CA (US)

(72) Inventor: Gokul Anand Manimaran, Bangalore (IN)

(73) Assignee: Visa International Service Association, San Francisco, CA (US)

( * ) Notice: Subject to any disclaimer, the term of this patent is extended or adjusted under 35 U.S.C. 154(b) by 149 days.

(21) Appl. No.: 18/530,037

(22) Filed: Dec. 5, 2023

(65) Prior Publication Data

US 2025/0181696 A1     Jun. 5, 2025

(51) Int. Cl.
    *G06F 21/34*          (2013.01)
    *G09B 21/00*          (2006.01)
(52) U.S. Cl.
    CPC ........... *G06F 21/34* (2013.01); *G09B 21/003* (2013.01)
(58) Field of Classification Search
    CPC ............................. G06F 21/34; G09B 21/003
    USPC ........................................................ 726/20
    See application file for complete search history.

(56) References Cited

U.S. PATENT DOCUMENTS

| | | | | |
|---|---|---|---|---|
| 6,162,059 A | * | 12/2000 | Murphy | G09B 21/003 |
| | | | | 273/153 S |
| 10,847,056 B2 | | 11/2020 | Lau et al. | |
| 2006/0280294 A1 | * | 12/2006 | Zhang | H04M 1/72481 |
| | | | | 379/52 |
| 2020/0117862 A1 | * | 4/2020 | Chen | G06F 3/0393 |

FOREIGN PATENT DOCUMENTS

DE        102011107782 A1 *  3/2013  ........... G06F 3/0238

* cited by examiner

*Primary Examiner* — Jacob Lipman
(74) *Attorney, Agent, or Firm* — Buckley Patent Law LLC; Timothy Emmanuel Buckley

(57)        ABSTRACT

In some embodiments, a system includes a processor and a non-transitory computer readable medium coupled to the processor. In some embodiments, the non-transitory computer readable medium includes code that generates a randomized set of keys for authentication purposes, communicates to a reconfigurable braille (RB) board to render raised RB board keys on the RB board according to a randomized order of the randomized set of keys, and utilizes the raised RB board keys to ascertain an authentication code that is utilized to authenticate a user of a mobile device. In some embodiments, the non-transitory computer readable medium further includes code that maps each key in the randomized set of keys to an authentication character in an authentication code.

20 Claims, 6 Drawing Sheets

RECONFIGURABLE BRAILLE BOARD-BASED AUTHENTICATION UNIT
340

BRAILLE BOARD-BASED
INFORMATION KEY
RANDOMIZATION UNIT
441

BRAILLE BOARD KEY
RAISING UNIT
442

BRAILLE BOARD-BASED
INFORMATION KEY
REMAPPING
UNIT
443

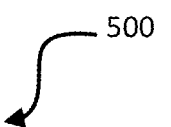

500

520

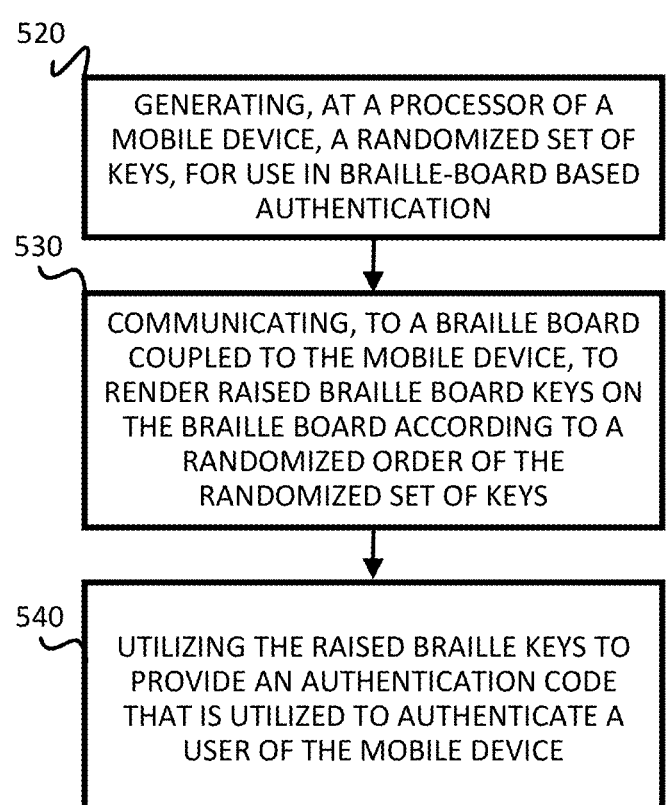

GENERATING, AT A PROCESSOR OF A MOBILE DEVICE, A RANDOMIZED SET OF KEYS, FOR USE IN BRAILLE-BOARD BASED AUTHENTICATION

530

COMMUNICATING, TO A BRAILLE BOARD COUPLED TO THE MOBILE DEVICE, TO RENDER RAISED BRAILLE BOARD KEYS ON THE BRAILLE BOARD ACCORDING TO A RANDOMIZED ORDER OF THE RANDOMIZED SET OF KEYS

540

UTILIZING THE RAISED BRAILLE KEYS TO PROVIDE AN AUTHENTICATION CODE THAT IS UTILIZED TO AUTHENTICATE A USER OF THE MOBILE DEVICE

*FIG. 5*

RECONFIGURABLE BRAILLE BOARD-BASED AUTHENTICATION SYSTEM AND METHOD THEREFOR

BACKGROUND

The background description provided herein is for the purpose of generally presenting the context of the disclosure. Work of the presently named inventor(s), to the extent it is described in this background section, as well as aspects of the description that may not otherwise qualify as prior art at the time of filing, are neither expressly nor impliedly admitted as prior art against the present disclosure.

Visually impaired users of mobile phones generally have a difficult time utilizing the mobile phones during the authentication process, as manufacturers of mobile phones traditionally do not design mobile phones for visually impaired users. Furthermore, during authentication of a visually impaired user, when the visually impaired user is inputting, for example, a pin or a password into the mobile phone, it is generally difficult for the visually impaired user to prevent non-visually impaired users located near the visually impair user from ascertaining the authentication code. As a result, a need exists to provide systems capable of allowing mobile phones to be securely utilized by visually impaired users.

BRIEF DESCRIPTION OF THE DRAWINGS

FIG. 5 is a flow diagram illustrating a reconfigurable braille board-based authentication method in accordance with some embodiments.

DETAILED DESCRIPTION

Figure 1:
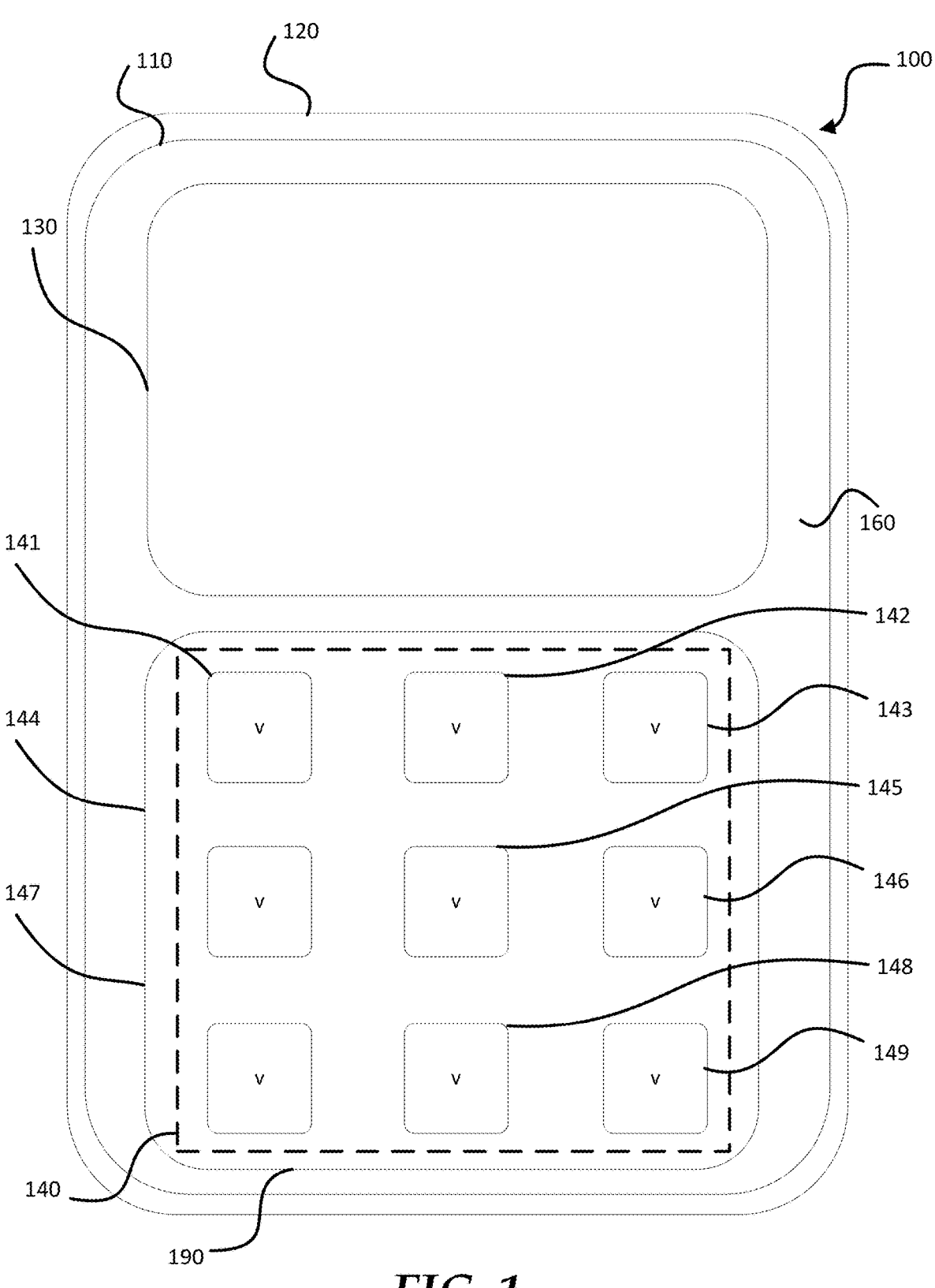
FIG. 1 illustrates a front perspective of a reconfigurable braille board-based authentication system in accordance with some embodiments.

FIG. 1 illustrates a front perspective of a reconfigurable braille (RB) board-based authentication system 100 in accordance with some embodiments. In some embodiments, RB board-based authentication system 100 includes a mobile device 110 electronically and physically coupled to an RB board 120 to execute RB board-based authentication operations described herein. In some embodiments, the RB board-based authentication operations performed by RB board-based authentication system 100 are configured to allow a user of the mobile device 110, such as, for example, a visually impaired user of the mobile device 110, to be authenticated by discretely providing, via an RB board keypad on RB board 120, braille-based information (e.g., authentication code, pin, etc.) associated with randomized RB board-linked display keys of an RB board-linked keypad to the visually impaired user, and utilizing the braille-based information associated with randomized RB board-linked display keys received via the RB board-linked virtual keypad and/or the RB board keypad to authenticate the visually impaired user. In some embodiments, mobile device 110 is configured to perform the RB board-based authentication operations such that a third party privy to the immediate surroundings of the visually impaired user that is attempting to nefariously ascertain the braille-based information by, for example, visually tracking keys used as input by the fingers of the visually impaired user, ascertains "dummy" braille-based information from the visual inspection and is thus not be able to accurately ascertain the actual braille-based information input by the visually impaired user into mobile device 110. In some embodiments, as an improvement over other systems, by utilizing the RB board-based authentication operations described herein, the privacy and security of the visually impaired user is maintained during authentication of the visually impaired user using RB board-based authentication system 100.

Figure 2:
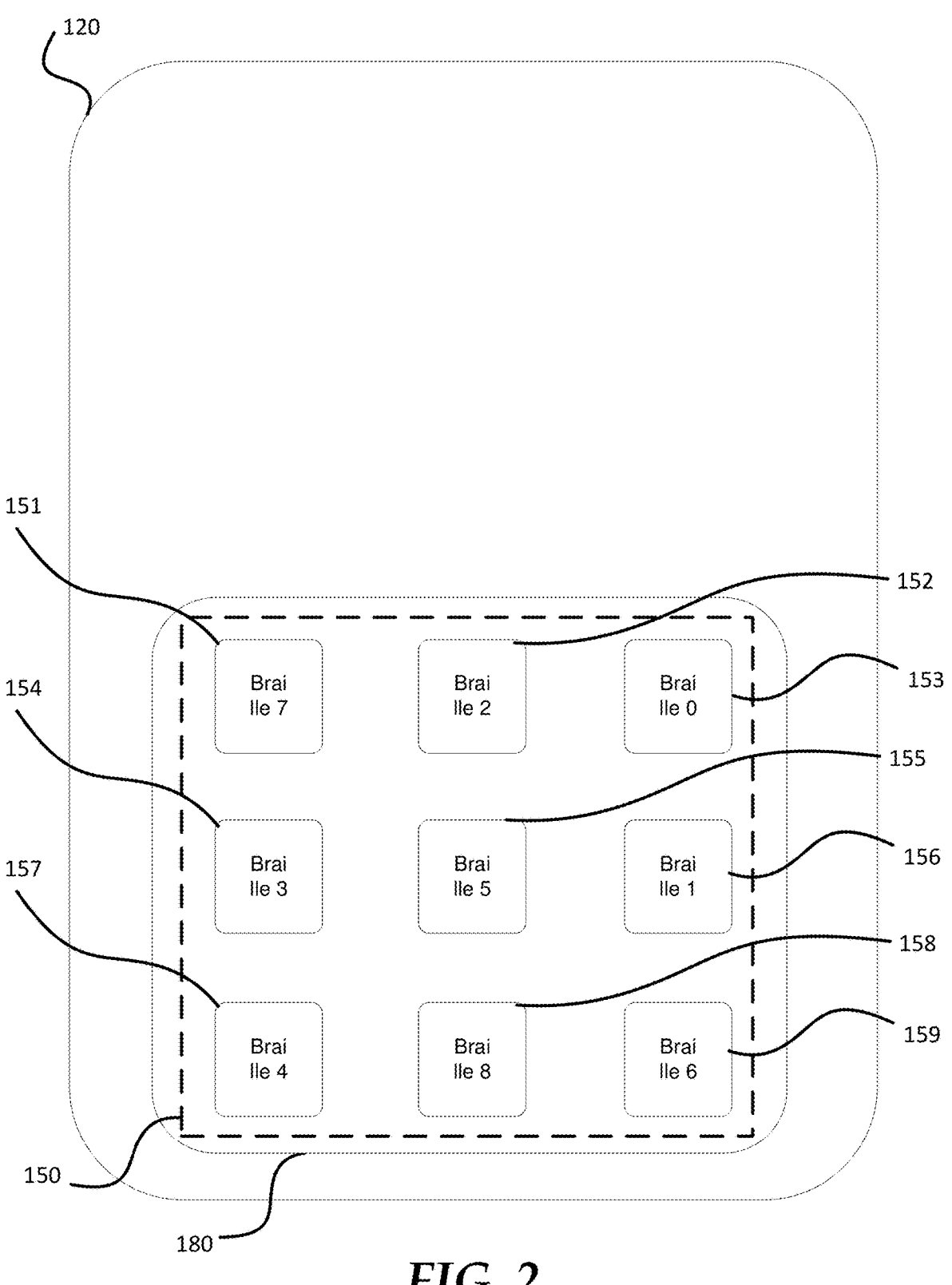
FIG. 2 illustrates a back perspective of the reconfigurable braille board-based authentication system of FIG. 1 illustrating a reconfigurable braille board in accordance with some embodiments.

In some embodiments, RB board 120, illustrated in further detail in FIG. 2, is an RB board configured to be electronically and physically coupled to a backside of the mobile device 110 to allow mobile device 110 to operationally communicate with RB board 120 to implement the RB board-based authentication operations described herein. In some embodiments, RB board 120 is configured to execute braille board-based reconfiguration randomization and elevation instructions received from mobile device 110 that instruct RB board 120 to raise RB board keys of RB board keys 150 that map to the randomized RB board-linked display keys associated with the braille-based information.

In some embodiments, RB board 120 is electronically and physically coupled to the backside of the mobile device 110 such that RB board 120 is securely fastened to the backside of mobile device 110 to allow braille-based information associated with randomized RB board-linked display keys to be relayed to a visually impaired user via RB board keys 150 of FIG. 2. In some embodiments, RB board keys 150 are RB keys that are configured to relay braille-based information associated with randomized RB board-linked display keys to the visually impaired user of the RB board-based authentication system 100, and/or input braille-based information associated with randomized RB board-linked display keys from the visually impaired user of the RB board-based authentication system 100.

In some embodiments, mobile device 110 is a communication device that, in addition to being configured to perform traditional mobile phone operations, such as, for example, operating as a smart mobile phone device, is configured to execute RB board-based authentication operations described herein. In some embodiments, mobile device 110 is configured to utilize a braille board-based mobile device authentication unit (described further in detail with reference to FIGS. 2-4) to execute RB board-based authentication operations described herein. In some embodiments, mobile device 110, may be, for example, a smartphone, smart tablet, or any other device capable of being electronically coupled to RB board 120 to implement the RB board-based authentication operations described herein.

Figure 3:
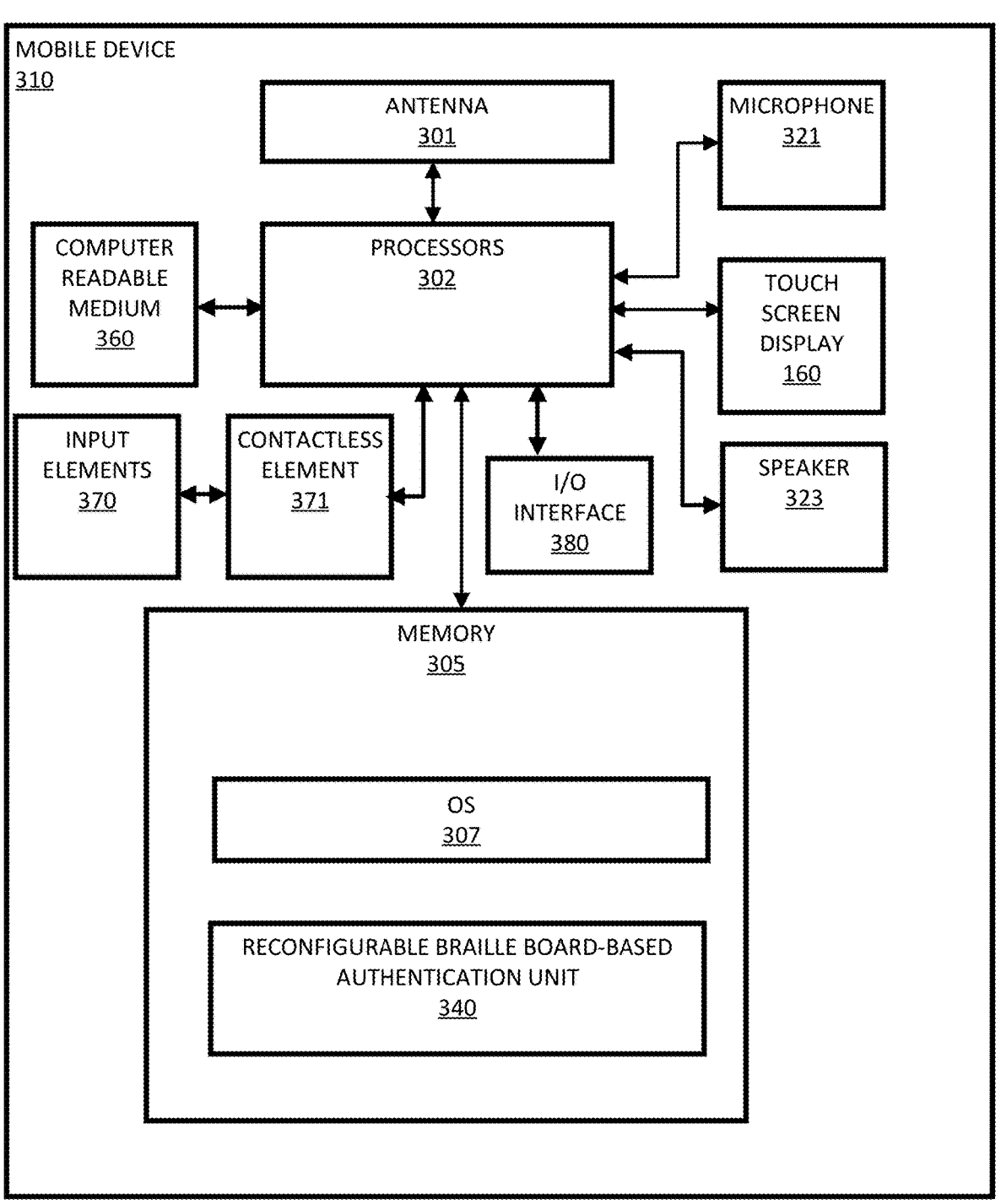
FIG. 3 illustrates a block diagram of a mobile device of the reconfigurable braille board-based authentication system of FIG. 1 in accordance with some embodiments.

In some embodiments, in addition to including the non-display components of mobile device 110 illustrated in FIG. 3 described further herein, mobile device 110 includes a touch screen display 160 that, in addition to being configured to perform traditional touch screen display operations, is configured to receive touch screen display input (e.g., braille-based information associated with randomized RB board-linked display keys) from a visually impaired user of RB board-based authentication system 100. In some embodiments, touch screen display 160 includes an RB board-linked keypad 190 (which includes RB board-linked display keys 140) and display unit 130. In some embodiments, display unit 130 is an image display of touch screen display 160 configured to display enlarged text, images, etc., for view and touch screen input by a visually impaired user of mobile device 110.

In some embodiments, RB board-linked display keys 140 are reconfigurable touch screen display keys on a virtual keypad of touch screen display 160 that, in addition to being configured to allow touch screen key input from the visually impaired user of mobile device 110, are configured to be linked to RB board keys 150 of RB board 120 to perform at least a portion of the RB board-based authentication operations described herein.

In some embodiments, RB board-linked display keys 140 are configured to be linked to RB board keys 150 such that braille-based information associated with each RB board key in RB board keys 150 may be provided to mobile device 110 via an associated RB board-linked display key of RB board-linked display keys 140. For example, in some embodiments, when braille-based information associated with a randomized RB board-linked display key is relayed to a visually impaired user via an RB board key 151, the visually impaired user may input the braille-based information associated with RB board key 151 via RB board-linked display key 141, as RB board key 151 is linked to RB board-linked display key 141.

In some embodiments, with further reference to RB board-linked display keys 140, an RB board-linked display key may refer to a reconfigurable button and associated digit or character on an RB board-linked keypad 190 that is linked to an RB-board key of RB board keypad, such as, for example, RB board keypad 180. In some embodiments, each RB board-linked display key may be associated with braille-based information, such as, a numerical digit (e.g., 0-9), or additional symbols or characters, depending on the context of the RB board-linked keypad 190. In some embodiments, RB board-linked display keys are pressed or tapped by a visually impaired user to input braille-based information, such as, braille board provided numbers or characters, into the mobile device 110. In some embodiments, each RB board-linked display key typically has a graphical representation on the touchscreen and may respond to touch or press interactions from the virtually impaired user, registering the corresponding digit or character when activated.

In some embodiments, with further reference to FIG. 1, RB board-linked display keys 140 includes an RB board-linked display key 141, an RB board-linked display key 142, an RB board-linked display key 143, an RB board-linked display key 144, an RB board-linked display key 145, an RB board-linked display key 146, an RB board-linked display key 147, an RB board-linked display key 148, and an RB board-linked display key 149. In some embodiments, as stated previously, each RB board-linked display key in RB board-linked display keys 140 is configured to be linked to an RB board key of RB board keys 150, illustrated by way of example in FIG. 2.

For example, in some embodiments, with reference to FIG. 1 and FIG. 2, RB board-linked display key 141 may be linked to an RB board key 151, RB board-linked display key 142 may be linked to an RB board key 152, RB board-linked display key 143 may be linked to an RB board key 153, RB board-linked display key 144 may be linked to an RB board key 154, RB board-linked display key 145 may be linked to an RB board key 155, RB board-linked display key 146 may be linked to an RB board key 156, RB board-linked display key 147 may be linked to an RB board key 157, RB board-linked display key 148 may be linked to an RB board key 158, and RB board-linked display key 148 may be linked to an RB board key 159. In some embodiments, because RB board-linked display keys 140 are linked to RB board keys 150, a visually impaired user of the RB board-based authentication system 100 is able to ascertain braille-based information associated with randomized RB board-linked display keys from RB board keys 150 (via the fingers of a hand of the visually impaired user positioned on the RB board keys 150), and input the braille-based information associated with randomized RB board-linked display keys via RB board-linked display keys 140 on touch screen display 160, as described further herein.

FIG. 2 illustrates a back perspective of the RB board-based authentication system 100 depicting RB board 120 of FIG. 1 in accordance with some embodiments. In some embodiments, in addition to including braille board components that are configured to allow the RB board 120 to communicate with mobile device 110 and implement the RB board-based authentication operations described herein, RB board 120 includes an RB board keypad 180 (which includes RB board keys 150). In some embodiments, as stated previously, RB board keys 150 are RB board keys that are configured to relay or provide braille-based information associated with randomized RB board-linked display keys (also referred to herein as a randomized set of RB board-linked display keys) to the visually impaired user of the RB board-based authentication system 100 or receive braille-based information associated with a randomized set of RB board-linked display keys from the visually impaired user of the RB board-based authentication system 100.

In some embodiments, RB board keys 150 includes an RB board key 151, an RB board key 152, an RB board key 153, an RB board key 154, an RB board key 155, an RB board key 156, an RB board key 157, an RB board key 158, and an RB board key 159. In some embodiments, RB board keys 150 are RB board keys that are configured to rise or elevate to relay braille-based information to the visually impaired user of RB board-based authentication system 100. In some embodiments, RB board keys 150 are configured to rise according to executable braille board-based reconfiguration randomization and elevation instructions received from mobile device 110 associated with implementing the RB board-based authentication operations described herein.

In some embodiments, the rise of the RB board keys of RB board keys 150 relays (utilizing, for example, braille) braille-based information associated with a randomized set of RB board-linked display keys to the visually impaired user of the RB board-based authentication system 100. In some embodiments, the braille-based information associated with a randomized set of RB board-linked display keys may represent, for example, an authentication code, pin, or other types of input prompts. In some embodiments, as described herein, the visually impaired user that is holding the RB board-based authentication system 100 in, for example, a hand of the visually impaired user, may input the braille-based information indicated by the rise of RB board keys of RB board keys 150 into RB board keys 150 or RB board-linked display keys 140. For example, in some embodiments, an authentication code indicated by the raised RB board keys of RB board keys 150 may be input into the mobile device 110 for authentication of the visually impaired user utilizing the raised RB board keys of RB board keys 150 or associated RB board-linked display keys of RB board-linked display keys 140 displayed on a screen display of mobile device 110, as described further herein with reference to FIG. 3 and FIG. 4.

FIG. 3 illustrates a block diagram of mobile device 110 in accordance with some embodiments. In some embodiments, mobile device 110 includes an antenna 301, processor/s 302, a computer readable medium 360, input elements 370, a contactless element 371, a microphone 321, a touch screen display 160, a speaker 323, an I/O interface 380, and memory 305. In some embodiments, memory 305 includes an operating system 307 and RB board-based authentication unit 340. In some embodiments, operating system 307 is configured to, in addition to performing traditional operating system operations for mobile device 110, perform the operating system operations required to communicate with RB board 120 and perform the operating system operations required to perform the RB board-based authentication operations described herein.

In some nonlimiting embodiments or aspects, the RB board-based authentication unit 340 has executable code configured to implement embodiments of the RB board-based authentication operations described herein. In some embodiments, for example, RB board-based authentication unit 340 is configured to execute an RB board-based authentication method 500 to authenticate a visually impaired user of RB board-based authentication system 100 as described further herein.

Furthermore, one or more computer-readable storage media, e.g., computer readable medium 360, may be utilized in implementing embodiments consistent with the present disclosure. In some embodiments, computer readable medium 360 may include code, executable by the processor/s 302 for implementing embodiments described herein. In some embodiments, a computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, e.g., non-transitory. In some embodiments, computer readable medium 360 may be in the form of a memory that stores data. Examples include Random Access Memory (RAM), Read-Only Memory (ROM), volatile memory, non-volatile memory, and any other known physical storage media capable of being utilized by mobile device 310.

In some embodiments, memory 305 may also store information such as access data. In general, any of this information may be transmitted by the mobile device 110 to another device, using any suitable method, including the use of antenna 301 or contactless element 371. In some embodiments, a body of mobile device 110 may be in the form a plastic substrate, housing, or other structure.

In some embodiments, mobile device 110 may further include a contactless element 371, which is typically implemented in the form of a semiconductor chip (or other data storage element) with an associated wireless transfer (e.g., data transmission) element, such as an antenna. Contactless element 371 may be coupled to (e.g., embedded within) the mobile device 110 and data or control instructions that are transmitted via a cellular network may be applied to the contactless element 371 via a contactless element interface (not shown). Contactless element 371 may be capable of transferring and receiving data using a short-range wireless communication capability. In some embodiments, mobile device 110 may be capable of communicating and transferring data or control instructions via both cellular network (or any other suitable wireless network, e.g., the Internet or other data network) and short range communications.

In some embodiments, mobile device 110 may also include a processor/s 302 (e.g., a microprocessor) for processing the functions of the mobile device 110 and a touch screen display 160 to allow a visually impaired user of mobile device 110 input, access, and/or ascertain braille-based information and other information. In some embodiments, mobile device 110 may further include input elements 370 to allow a user to input information into mobile device 110, a speaker 323 to allow the user to hear voice communication, music, etc., and a microphone 321 to allow the visually impaired user to transmit audio (e.g., voice commands, etc.) through the mobile device 110. The mobile device 110 may also include an antenna 301 for wireless data transfer (e.g., data transmission).

In some embodiments, the processor/s 302 may be disposed in communication with one or more input/output (I/O) devices, such as, for example, RB board 120, via an I/O interface 380. In some embodiments, I/O interface 380 may employ communication protocols/methods required to communicate with RB board 120. In some embodiments, I/O interface 380 may employ communication protocols/methods that allow RB board 120 to be electronically and physically coupled to mobile device 110. In some embodiments, using the I/O interface 380, the mobile device 110 may communicate with one or more I/O devices in order to perform and/or execute the RB board-based authentication operations described herein.

In some embodiments, memory 305 may be coupled to the processor/s 302 and may store RB board-based authentication unit 340. In some embodiments, memory 305 may be in the form of one or more memory devices (e.g., RAM, EEPROM, ROM chips), using any suitable mode of data storage. In some embodiments, memory 305 in the mobile device 110 may also include a secure storage area for storing sensitive data such as payment credentials (account numbers, payment tokens, verification values, etc.) and access data. For example, memory 305 may be part of or may contain a secure element for storing sensitive data such as payment credentials (account numbers, payment tokens, verification values, etc.).

Figure 4:
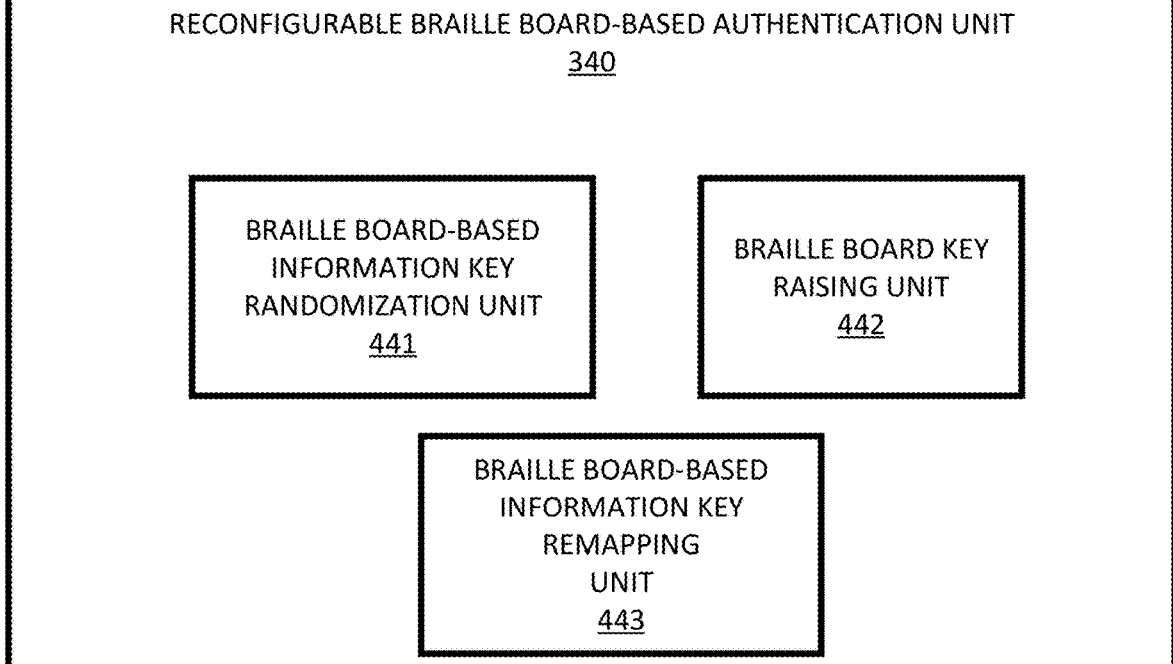
FIG. 4 illustrates a block diagram of a reconfigurable braille board-based authentication unit of the mobile device of FIG. 3 in accordance with some embodiments.

FIG. 4 illustrates an RB board-based authentication unit 340 in accordance with some embodiments. In some embodiments, as stated previously, RB board-based authentication unit 340 has executable code configured to execute the RB board-based authentication operations described herein. In some embodiments, RB board-based authentication unit 340 includes a braille board-based information key randomization unit 441, a braille board key raising unit 442, and a braille board-based information key remapping unit 443. In some embodiments, braille board-based information key randomization unit 441, braille board key raising unit 442, and braille board-based information key remapping unit 443 are collectively configured to perform the board-based mobile device authentication operations described herein.

In some embodiments, braille board-based information key randomization unit 441 is executable code configured to randomize an order of RB board-linked display keys associated with braille-based information to generate a randomized set of RB board-linked display keys associated with the braille-based information. In some embodiments, an order of the RB board-linked display keys of the RB board-linked display keys refers to a positioning of the RB board-linked display keys associated with the braille-based information in RB board-linked keypad 190. In some embodiments, braille board-based information key randomization unit 441 randomizes an order of RB board-linked display keys associated with the braille-based information to generate a randomized set of RB board-linked display keys by utilizing a random number generator (configured to utilize the braille-based information) to randomize the RB board-linked display keys. For example, in some embodiments, braille board-based information key randomization unit 441 may randomize the RB board-linked display keys associated with braille-based information in a first order such that, with an RB board-linked keypad 190 having nine RB board-linked display keys and thus nine RB board-linked display key positions, a character traditionally associated with a first RB board-linked display key position (e.g., an RB board-linked display key positioned at key position 1) is, after randomization, associated with a second RB board-linked display key position (e.g., an RB board-linked display key positioned at key position 5) in a second order (e.g., a randomized order). Thus, in some embodiments, for braille-based information having N characters and N RB board-linked display keys associated with the N characters, the N characters are positioned in RB board keypad 180 in a randomized order of N positions that map to the randomized order of the randomized set of RB board-linked display keys that is provided to the braille board key raising unit 442.

In some embodiments, braille board key raising unit 442 is executable code configured to provide braille board-based reconfiguration randomization and elevation instructions to RB board 120 to raise RB board keys of RB board keys 150 according to the randomized order of the randomized set of RB board-linked display keys associated with the braille-based information generated by braille board-based information key randomization unit 441. In some embodiments, the braille board-based reconfiguration randomization and elevation instructions may include, in addition to the randomized order of the randomized set of RB board-linked display keys to raise the RB board keys on the RB board 120, a notification to indicate to the visually impaired user via RB board keys 150 that braille-based information provided to the visually impaired user is randomized to prevent a third party from attaining the actual braille-based information (e.g., authentication code, pin, etc.) in order to maintain privacy of the visually impaired user.

In some embodiments, braille board-based information key remapping unit 443 is executable code configured to restore or remap the randomized order of the randomized set of RB board-linked display keys associated with the braille-based information to its appropriate or original order. In some embodiments, braille board-based information key remapping unit 443 restores the order of the randomized set of RB board-linked display keys associated with the braille-based information by reversing the randomized order of the randomization of the RB board-linked display keys in the original RB board-linked display keys. In some embodiments, braille board-based information key remapping unit 443 restores the randomized set of RB board-linked display keys associated with the braille-based information to its original order for authentication by an application requesting authentication of the visually impaired user.

In some embodiments, as illustrated by way of example, in operation, RB board-based authentication unit 340 receives authentication information (e.g., an authentication code, pin number, etc.) from an application (e.g., a financial application or other type of application requiring authentication) seeking authentication of the visually impaired user.

In some embodiments, the authentication information, as received from the application, is mapped to traditional keys positioned in a non-randomized order on a virtual keypad for non-visually impaired users. In some embodiments, since the authentication information provided from the application is mapped to traditional keys on a virtual keypad for non-visually impaired users, RB board-based authentication unit 340 converts the authentication information to braille-based information by mapping the authentication information to RB board-linked display keys 140 on mobile device 110. In some embodiments, RB board-based authentication unit 340 provides the braille-based information associated with RB board-linked display keys and the order of the RB board-linked display keys associated with the braille-based information to braille board-based information key randomization unit 441.

In some embodiments, braille board-based information key randomization unit 441 receives the order of the RB board-linked display keys and the braille-based information associated with RB board-linked display keys and randomizes the order of the RB board-linked display keys associated with the braille-based information to generate a randomized set of RB board-linked display keys. In some embodiments, the randomized set of RB board-linked display keys are the RB board-linked display keys associated with the braille-based information that are in a randomized order based on the randomization operations performed by braille board-based information key randomization unit 441.

In some embodiments, as the order of the RB board-linked display keys associated with the braille-based information have now been randomized, any third party viewing the visually impaired user input the braille-based information associated with randomized RB board-linked display keys will not view the actual authentication information, but instead view "dummy" authentication information (e.g., the RB board-linked display keys pressed by the visually impaired user on RB board-linked keypad 190 do not visually map to the actual authentication information input by the visually impaired user) that cannot be used to access the secured information of the visually impaired user. In some embodiments, after generating the randomized set of RB board-linked display keys and the randomized order of the randomized set of RB board-linked display keys, the randomized order of the randomized set of RB board-linked display keys and the associated braille-based information are provided to braille board key raising unit 442.

In some embodiments, braille board key raising unit 442 receives the randomized order of the randomized set of RB board-linked display keys and the associated braille-based information and communicates to RB board 120 the braille board-based reconfiguration randomization and elevation instructions to render raised RB board keys on RB board 120 that map to the randomized order of the randomized set of RB board-linked display keys to relay the associated braille-based information. That is, in some embodiments, braille board key raising unit 442 receives the randomized order of RB board-linked display keys from braille board-based information key randomization unit 441 and instructs RB board 120 to raise the RB board keys of RB board keys 150 that map to the randomized order of the randomized set of RB board-linked display keys.

In some embodiments, RB board 120 receives the braille board-based reconfiguration randomization and elevation instructions and associated braille-based information from braille board key raising unit 442 of mobile device 110 and raises the RB board keys according to the randomized order of the randomized set of RB board-linked display keys. In some embodiments, RB board 120 raises the RB board keys in RB board keys 150 according to the randomized order of the randomized set of RB board-linked display keys such that the visually impaired user may ascertain the braille-based information associated with the randomized order of RB board-linked display keys via the RB board keys in RB board keypad 180. In some embodiments, by raising the RB board keys according to the randomized order of the randomized set of RB board-linked display keys, RB board 120 is relaying the braille-based information associated with the randomized set of RB board-linked display keys to the visually impaired user, who may input the braille-based information associated with the randomized set of RB board-linked display keys into either RB board keypad 180 or RB board-linked keypad 190 for authentication purposes.

In some embodiments, the visually impaired user of RB board-based authentication system 100 ascertains the braille-based information from the raised RB board keys of RB board keys 150 and utilizes either RB board keys 150 or RB board-linked display keys 140 to discretely input the braille-based information for authentication.

In some embodiments, braille board-based information key remapping unit 443 of RB board-based authentication unit 340 receives the braille-based information input by the visually impaired user and remaps the order of the randomized set of RB board-linked display keys for proper authentication by the application initiating the authentication request. In some embodiments, braille board-based information key remapping unit 443 provides the authentication information input associated with either RB board keypad 180 or RB board-linked keypad 190 to an application or an authentication unit on mobile device 110 for authentication.

FIG. 5 is a flow diagram illustrating an RB board-based authentication method 500 in accordance with some embodiments. The method, process steps, or stages illustrated in the figures may be implemented as an independent routine or process, or as part of a larger routine or process. Note that each process step or stage depicted may be implemented as an apparatus that includes a processor executing a set of instructions, a method, or a system, among other embodiments. In some embodiments, RB board-based authentication method 500 is described with reference to the figures described herein.

In some embodiments, at operation 520, braille board-based information key randomization unit 441 of an RB board-based authentication unit 340 generates a randomized set of RB board-linked display keys for use during authentication of a visually impaired user of RB board-based authentication system 100. In some embodiments, as stated previously, during the process of generating a randomized set of RB board-linked display keys, braille board-based information key randomization unit 441 generates a randomized order of the randomized set of RB board-linked display keys. In some embodiments, after generating the randomized set of RB board-linked display keys and the randomized order of the randomized set of RB board-linked display keys, operation 520 proceeds to operation 530.

In some embodiments, at operation 530, braille board key raising unit 442 of RB board-based authentication unit 340 communicates to RB board 120 coupled to mobile device 110 to render raised RB board keys of RB board keys 150 of RB board 120. In some embodiments, the RB board 120 may be integrated into a phone case coupled to the mobile device 110. In some embodiments, RB board-based authentication unit 340 communicates to RB board 120 to render raised RB board keys of RB board keys 150 on RB board 120 according to the randomized order of the randomized set of RB board-linked display keys. In some embodiments, after communicating to RB board 120 to render raised RB board keys of RB board keys 150 of RB board 120 according to the randomized order of the randomized set of RB board-linked display keys, operation 530 proceeds to operation 540.

In some embodiments, at operation 540, after the RB board keys of RB board keys 150 have been raised according to the randomized order of the randomized set of RB board-linked display keys, the raised RB board keys are utilized to provide an authentication code to a visually impaired user that is utilized to authenticate the visually impaired user of mobile device 110. In some embodiments, the visually impaired user ascertains the authentication code by placing the fingers of the visually impaired user on the raised RB board keys of RB board keys 150 of RB board 120 and utilizes either RB board keys 150 or RB board-linked display keys 140 to discretely input the braille-based information (e.g., authentication code) into mobile device 110 for authentication purposes, as described previously herein with reference to FIG. 1-FIG. 6.

Figure 6:
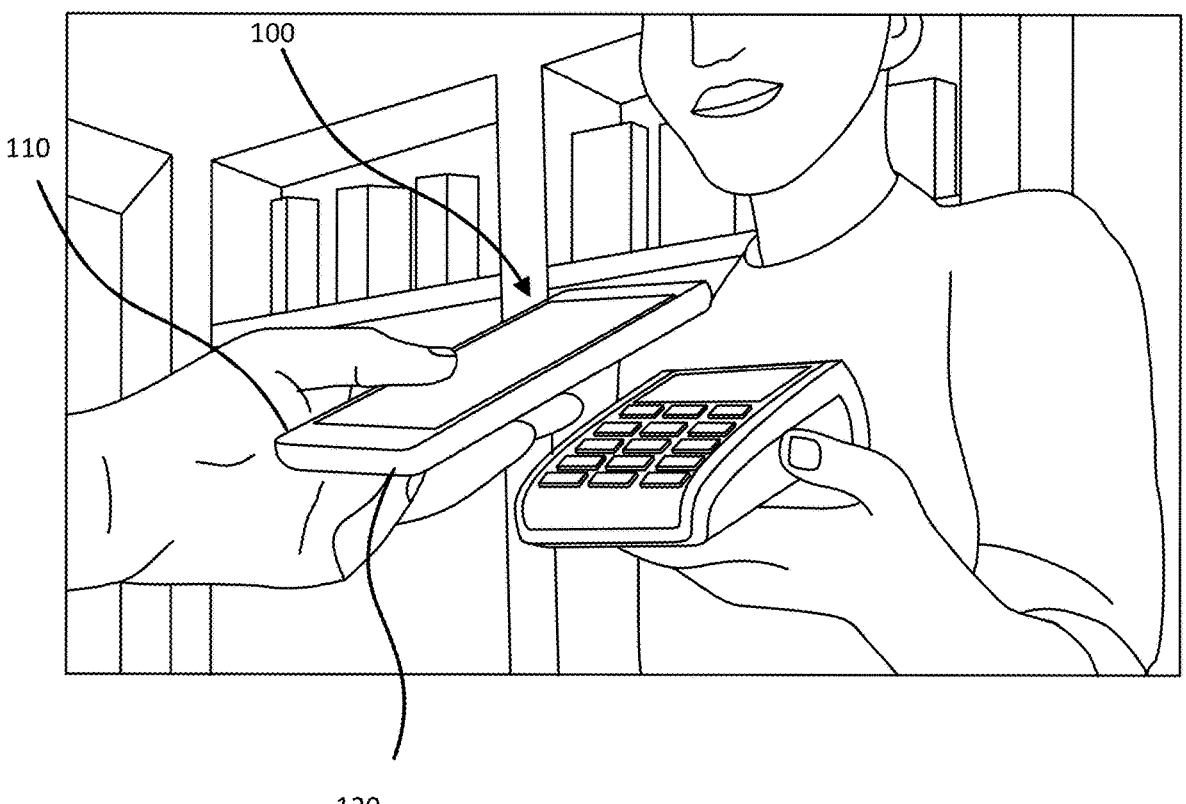
FIG. 6 illustrates an example implementation of the reconfigurable braille board-based authentication system of FIG. 1 in accordance with some embodiments.

FIG. 6 illustrates an example implementation 600 of the reconfigurable braille board-based authentication system 100 of FIG. 1 in accordance with some embodiments. In some embodiments, as illustrated by way of example, when a visually impaired user utilizes mobile device 110 (e.g., smart device) for authentication purposes, a braille-based input (e.g., braille-based information) received from the visually impaired user using RB board 120 (located on the backside of mobile device 110) and/or RB board-linked keypad 190 of mobile device 110 may be considered "secure by design" based on, for example, the reconfigurability of the RB board 120 and/or the positioning of the RB board 120 on the backside of mobile device 110. In some embodiments, due to the utilization of embodiments described herein, third parties that may be privy to the surroundings of the visually impaired user cannot see or recognize the braille-based information input into RB board-based authentication system 100 by the visually impaired user.

In some embodiments, a method, includes: generating, at a processor of a mobile device, a randomized set of keys; communicating to a reconfigurable braille board coupled to the mobile device to render raised reconfigurable braille board keys on the reconfigurable braille board according to a randomized order of the randomized set of keys; and utilizing the raised reconfigurable braille board keys to provide an authentication code to a user of the mobile device that is utilized to authenticate the user of the mobile device.

In some embodiments of the method, each key in the randomized set of keys is mapped to an authentication character in the authentication code.

In some embodiments, the method further includes configuring reconfigurable braille board-linked display keys on a display of the mobile device to map to the randomized order of the raised reconfigurable braille board keys on the reconfigurable braille board.

In some embodiments, the method further includes utilizing the reconfigurable braille board-linked display keys to authenticate the user of the mobile device.

In some embodiments, the method further includes obfuscating the reconfigurable braille board-linked display keys for view on the display of the mobile device.

In some embodiments, the method further includes configuring the raised reconfigurable braille board keys on the reconfigurable braille board to allow the user of the mobile device to enter the authentication code for authentication of the user.

In some embodiments, the method further includes utilizing the raised reconfigurable braille board keys on the reconfigurable braille board to authenticate the user of the mobile device.

In some embodiments of the method, the raised reconfigurable braille board keys on the reconfigurable braille board are configured to vibrate to indicate to the user that the authentication code is being provided.

In some embodiments, a system includes a processor; and a non-transitory computer readable medium coupled to the processor, the non-transitory computer readable medium including code that: generates a randomized set of keys for authentication purposes; communicates to a reconfigurable braille board to render raised reconfigurable braille board keys on the reconfigurable braille board according to a randomized order of the randomized set of keys; and utilizes the raised reconfigurable braille board keys to provide an authentication code that is utilized to authenticate a user of a mobile device.

In some embodiments of the system, the code maps each key in the randomized set of keys to an authentication character in the authentication code.

In some embodiments of the system, the code configures reconfigurable braille board-linked display keys on a display of the mobile device to map to the randomized order of the raised reconfigurable braille board keys on the reconfigurable braille board.

In some embodiments of the system, the code utilizes the reconfigurable braille board-linked display keys to authenticate the user of the mobile device.

In some embodiments of the system, the code obfuscates the reconfigurable braille board-linked display keys for view on the display of the mobile device.

In some embodiments of the system, the code configures the raised reconfigurable braille board keys on the reconfigurable braille board to allow the user of the mobile device to enter the authentication code for authentication of the user.

In some embodiments of the system, the code utilizes the raised reconfigurable braille board keys on the reconfigurable braille board to authenticate the user of the mobile device.

In some embodiments of the system, the raised reconfigurable braille board keys on the reconfigurable braille board are configured to vibrate to indicate to the user that the authentication code is being provided.

In some embodiments, a reconfigurable braille board-based authentication system, includes: a key randomization unit; and a reconfigurable braille board key raising unit coupled to the key randomization unit, wherein, based upon a randomized order of a randomized set of keys generated by the key randomization unit, the braille board key raising unit administers an execution of raised reconfigurable braille board keys on reconfigurable braille board according to the randomized order of the randomized set of keys, the raised reconfigurable braille board keys being administered such that the raised reconfigurable braille board keys are utilized for authentication purposes on a mobile device.

In some embodiments of the reconfigurable braille board-based authentication system, reconfigurable braille board-linked display keys on a display of the mobile device are configured to map to the randomized order of the raised reconfigurable braille board keys on the reconfigurable braille board.

12

In some embodiments of the reconfigurable braille board-based authentication system, the reconfigurable braille board-linked display keys are obfuscated for view on the display of the mobile device.

In some embodiments of the reconfigurable braille board-based authentication system, the raised reconfigurable braille board keys are configured on the reconfigurable braille board to allow a user of the mobile device to enter an authentication code for authentication of the user.

What is claimed is:

1. A method, comprising:
generating, at a processor of a mobile device, a randomized set of keys;
communicating to a reconfigurable braille board coupled to the mobile device to render raised reconfigurable braille board keys on the reconfigurable braille board according to a randomized order of the randomized set of keys; and
utilizing the raised reconfigurable braille board keys to provide an authentication code to a user of the mobile device that is utilized to authenticate the user of the mobile device, the mobile device being configured to display dummy authentication information for secured deception of non-visually impaired users.

2. The method of claim 1, wherein:
each key in the randomized set of keys is mapped to an authentication character in the authentication code.

3. The method of claim 2, further comprising:
configuring reconfigurable braille board-linked display keys on a display of the mobile device to map to the randomized order of the raised reconfigurable braille board keys on the reconfigurable braille board.

4. The method of claim 3, further comprising:
utilizing the reconfigurable braille board-linked display keys to authenticate the user of the mobile device.

5. The method of claim 4, further comprising:
obfuscating the reconfigurable braille board-linked display keys for view on the display of the mobile device.

6. The method of claim 5, further comprising:
configuring the raised reconfigurable braille board keys on the reconfigurable braille board to allow the user of the mobile device to enter the authentication code for authentication of the user.

7. The method of claim 6, further comprising:
utilizing the raised reconfigurable braille board keys on the reconfigurable braille board to authenticate the user of the mobile device.

8. The method of claim 7, wherein:
the raised reconfigurable braille board keys on the reconfigurable braille board are configured to vibrate to indicate to the user that the authentication code is being provided.

9. A system, comprising:
a processor; and
a non-transitory computer readable medium coupled to the processor, the non-transitory computer readable medium including code that:
generates a randomized set of keys for authentication purposes;
communicates to a reconfigurable braille board to render raised reconfigurable braille board keys on the reconfigurable braille board according to a randomized order of the randomized set of keys; and
utilizes the raised reconfigurable braille board keys to provide an authentication code that is utilized to authenticate a user of a mobile device, the system being configured to display dummy authentication information for secured deception of non-visually impaired users.

10. The system of claim 9, wherein:

the code maps each key in the randomized set of keys to an authentication character in the authentication code.

11. The system of claim 10, wherein:

the code configures reconfigurable braille board-linked display keys on a display of the mobile device to map to the randomized order of the raised reconfigurable braille board keys on the reconfigurable braille board.

12. The system of claim 11, wherein:

the code utilizes the reconfigurable braille board-linked display keys to authenticate the user of the mobile device.

13. The system of claim 12, wherein:

the code obfuscates the reconfigurable braille board-linked display keys for view on the display of the mobile device.

14. The system of claim 13, wherein:

the code configures the raised reconfigurable braille board keys on the reconfigurable braille board to allow the user of the mobile device to enter the authentication code for authentication of the user.

15. The system of claim 14, wherein:

the code utilizes the raised reconfigurable braille board keys on the reconfigurable braille board to authenticate the user of the mobile device.

16. The system of claim 15, wherein:

the raised reconfigurable braille board keys on the reconfigurable braille board are configured to vibrate to indicate to the user that the authentication code is being provided.

17. A reconfigurable braille board-based authentication system, comprising:

a key randomization unit; and a reconfigurable braille board key raising unit coupled to the key randomization unit, wherein, based upon a randomized order of a randomized set of keys generated by the key randomization unit, the braille board key raising unit administers an execution of raised reconfigurable braille board keys on a reconfigurable braille board according to the randomized order of the randomized set of keys, the raised reconfigurable braille board keys being administered such that the raised reconfigurable braille board keys are utilized for authentication purposes on a mobile device, the mobile device being configured to display dummy authentication information for secured deception of non-visually impaired users.

18. The reconfigurable braille board-based authentication system of claim 17, wherein:

reconfigurable braille board-linked display keys on a display of the mobile device are configured to map to the randomized order of the raised reconfigurable braille board keys on the reconfigurable braille board.

19. The reconfigurable braille board-based authentication system of claim 18, wherein:

the reconfigurable braille board-linked display keys are obfuscated for view on the display of the mobile device.

20. The reconfigurable braille board-based authentication system of claim 18, wherein:

the raised reconfigurable braille board keys are configured on the reconfigurable braille board to allow a user of the mobile device to enter an authentication code for authentication of the user.

* * * * *